(12) United States Patent
Sun et al.

(10) Patent No.: US 12,432,097 B2
(45) Date of Patent: Sep. 30, 2025

(54) TRACKING REFERENCE SIGNAL (TRS) ENHANCEMENT WITH DOPPLER SHIFT PRE-COMPENSATION

(71) Applicant: Apple Inc., Cupertino, CA (US)

(72) Inventors: Haitong Sun, Cupertino, CA (US); Dawei Zhang, Saratoga, CA (US); Wei Zeng, Saratoga, CA (US); Yushu Zhang, Beijing (CN); Hong He, San Jose, CA (US); Huaning Niu, San Jose, CA (US); Weidong Yang, San Diego, CA (US); Oghenekome Oteri, San Diego, CA (US); Seyed Ali Akbar Fakoorian, San Diego, CA (US); Sigen Ye, Whitehouse Station, NJ (US); Chunhai Yao, Beijing (CN)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/441,144

(22) PCT Filed: May 7, 2021

(86) PCT No.: PCT/CN2021/092187
§ 371 (c)(1),
(2) Date: Nov. 10, 2022

(87) PCT Pub. No.: WO2022/233042
PCT Pub. Date: Nov. 10, 2022

(65) Prior Publication Data
US 2024/0080224 A1 Mar. 7, 2024

(51) Int. Cl.
*H04L 25/02* (2006.01)
*H04B 7/01* (2006.01)
(Continued)

(52) U.S. Cl.
CPC .......... *H04L 25/0224* (2013.01); *H04B 7/01* (2013.01); *H04L 5/0048* (2013.01); *H04L 25/0222* (2013.01); *H04L 27/261* (2013.01)

(58) Field of Classification Search
CPC ............... H04L 25/0224; H04L 5/0048; H04L 25/0222; H04L 27/261; H04L 1/0061;
(Continued)

(56) References Cited

U.S. PATENT DOCUMENTS 3,495,260 A    2/1970 Laughlin et al.
11,258,566 B2  2/2022 Nam et al.
(Continued)

FOREIGN PATENT DOCUMENTS

CN    109587819 A    4/2019
CN    111226413 A    6/2020
(Continued)

OTHER PUBLICATIONS

"Enhancements on HST-SFN" 3GPP TSG RAN WG1 #104b-e e-Meeting, Apr. 12-20, 2021 (R1-2103225) (Year: 2021).*
(Continued)

*Primary Examiner* — Sun Jong Kim
(74) *Attorney, Agent, or Firm* — STERNE, KESSLER, GOLDSTEIN & FOX P.L.L.C.

(57) ABSTRACT

Some aspects of this disclosure relate to apparatuses and methods for implementing mechanisms for a network to use Doppler shift pre-compensation values for communicating Tracking Reference Signal (TRS) to a user equipment (UE) and for implementing mechanisms for triggering the UE to measure the Doppler shift pre-compensated TRS. Some aspects of this disclosure relate to a base station including a processor that determines a Doppler shift pre-compensation value associated with the UE in response to determining that the UE is moving with a speed greater than a threshold. The
(Continued)

processor further generates an aperiodic Tracking Reference Signal (AP-TRS) or a semi persistent TRS (SP-TRS) for the UE. The AP-TRS or the SP-TRS is decoupled from a periodic TRS (P-TRS). The processor further transmits the AP-TRS or the SP-TRS to the UE. The AP-TRS or the SP-TRS can be used for time and frequency synchronization.

17 Claims, 6 Drawing Sheets

(51) Int. Cl.
*H04L 5/00* (2006.01)
*H04L 27/26* (2006.01)

(58) Field of Classification Search
CPC . H04B 7/01; H04B 7/18513; H04W 56/0035; H04W 56/0015; H04W 88/08
See application file for complete search history.

(56) References Cited

U.S. PATENT DOCUMENTS

| | | | |
|---|---|---|---|
| 11,456,830 | B2 | 9/2022 | Lee et al. |
| 2014/0086111 | A1* | 3/2014 | Li ............ H04W 72/0446 370/336 |
| 2017/0289834 | A1* | 10/2017 | Axmon ............ H04W 74/0866 |
| 2018/0205526 | A1 | 7/2018 | Kim et al. |
| 2018/0227929 | A1 | 8/2018 | Yoo et al. |
| 2019/0306801 | A1* | 10/2019 | Zhou ............ H04W 52/04 |
| 2020/0374079 | A1 | 11/2020 | Chervyakov et al. |
| 2021/0059004 | A1* | 2/2021 | Wu ............ H04W 24/08 |
| 2021/0345249 | A1* | 11/2021 | Xue ............ H04W 28/0247 |
| 2022/0116256 | A1* | 4/2022 | Shahmohammadian ............ H04L 27/2675 |
| 2024/0414029 | A1 | 12/2024 | Sun et al. |

FOREIGN PATENT DOCUMENTS

| | | | |
|---|---|---|---|
| CN | 111566974 | A | 8/2020 |
| WO | WO 2019/195171 | A1 | 10/2019 |
| WO | WO 2020147596 | A1 | 7/2020 |
| WO | WO-2021038659 | A1 * | 3/2021 |
| WO | WO 2021066625 | A1 | 4/2021 |

OTHER PUBLICATIONS

"Enhancements to support HST-SFN deployment scenario" 3GPP TSG RAN WG1 #104b-e e-Meeting, Apr. 12-20, 2021 (R1-2102764) (Year: 2021).*
English Translation of WO2021038659 (Year: 2021).*
International Search Report of the International Searching Authority directed to related International Patent Application No. PCT/CN2021/092187, mailed Jan. 25, 2022; 4 pages.
3GPP TS 38.214 V16.5.0 (Mar. 2021), "3rd Generation Partnership Project; Technical Specification Group Radio Access Network; NR; Physical layer procedures for data (Release 16)," 650 Route des Lucioles—Sophia Antipolis Valbonne—France; 171 pages.
Mediatek Inc., "On TRS design and remaining issues," 3GPP TSG-RAN WG1 Meeting Ad-hoc#3, R1-1716229 Sep. 21, 2017(Sep. 21, 2017); 14 pages.
3GPP TSG RAN WG1 Meeting 91, "Chairman's notes for AI 7.2 NR-MIMO," R1-1721657, Dec. 4, 2017; 38 pages.
Feng Xu, "Analysis of Radio Magnetic Signal Interference in Digital Trunked Communication System," with English-Language machine translation attached, Jun. 30, 2013.
Futurewei, "Enhancement to support HST-SFN deployment scenario," 3GPP TSG RAN WG1 Meeting #104bis-e, e-Meeting, Apr. 12-20, 2021, R1-2102764; 6 pages.
Qualcomm Incorporated, "Enhancements on HST-SFN deployment," 3GPP TSG-RAN WG1 Meeting #104bis-e, e-Meeting, Apr. 12-20, 2021, R1-2103154; 35 pages.
Samsung, "Enhancements on HST-SFN," 3GPP TSG RAN WG1 #104b-e, e-Meeting, Apr. 12-20, 2021, R1-2103225; 9 pages.
Apple Inc., "Views on Rel-17 HST enhancement," 3GPP TSG-RAN WG1 Meeting #104b-e, e-Meeting, Apr. 12-20, 2021, R1-2103092; 5 pages.
Extended European Search Report directed to European Application No. 24181883.0, mailed Nov. 12, 2024; 13 pages.
Extended European Search Report directed to European Application No. 21939688.4, mailed Nov. 12, 2024; 10 pages.
Ericsson, "Details on TRS design," 3GPP TSG-RAN WG1 Meeting #NR3, Nagoya, Japan, 18-21, Sep. 2017, R1-1716375; 37 pages.
ZTE, "Discussion on draft CRs on RS and QCL," 3GPP TSG RAN WG1 Meeting #95, Spokane, USA, Nov. 12-16, 2018, R1-1813915; 7 pages.
Wang, "Analysis of LTE Base Station Performance Testing," with English-language machine translation attached to the document, Apr. 15, 2011; 14 pages.
Notice of Grant directed to related Chinese Application No. 202210473228.7, with English-language machine translation attached, mailed Mar. 29, 2024; 10 pages.
Written Opinion directed to related International Patent Application No. PCT/CN2021/092187, mailed Jan. 25, 2022; 4 pages.

* cited by examiner

TRACKING REFERENCE SIGNAL (TRS) ENHANCEMENT WITH DOPPLER SHIFT PRE-COMPENSATION

CROSS-REFERENCE TO RELATED APPLICATION

This application is a U.S. National Phase of International Application No. PCT/CN2021/092187, filed May 7, 2021, which is hereby incorporated by reference in its entirety.

BACKGROUND

Field

The described aspects generally relate to mechanisms for a network to use Doppler shift pre-compensation values for communicating Tracking Reference Signal (TRS) to a user equipment (UE) and to mechanisms for triggering the UE to measure the Doppler shift pre-compensated TRS.

Related Art

When a UE is moving with a high speed (e.g., a speed that is greater than a threshold), the UE can communicate with multiple base stations (for example, an evolved Node B (eNB), a next generation Node B (gNB), a Transmission and Reception Point (TRP), etc.) during its movement. Because of the UE's movement, the UE will experience a frequency shift (e.g., a Doppler shift) in the signals that the UE receives from each base station. In some aspects, the Doppler shift can be a function of UE's speed and the carrier frequency of the signal used for the communication between the UE and the base station. The Doppler shift can result in changes in the channel between the UE and the base station. The Doppler shift experienced by the UE can result in poor channel estimation by the UE.

SUMMARY

Some aspects of this disclosure relate to apparatuses and methods for implementing mechanisms for Tracking Reference Signal (TRS) enhancement with Doppler shift pre-compensation. For example, some aspects of this disclosure relate to apparatuses and methods for implementing mechanisms for a network to use Doppler shift pre-compensation values for communicating TRS to a UE and for implementing mechanisms for triggering the UE to measure the Doppler shift pre-compensated TRS.

Some aspects of this disclosure relate to a base station. The base station includes a transceiver configured to enable wireless communication with a user equipment (UE) and includes a processor communicatively coupled to the transceiver. The processor determines a Doppler shift pre-compensation value associated with the UE in response to determining that the UE is moving with a speed greater than a threshold. The processor further generates an aperiodic Tracking Reference Signal (AP-TRS) or a semi persistent TRS (SP-TRS) for the UE. The AP-TRS or the SP-TRS is decoupled from a periodic TRS (P-TRS) generated by the base station. In some aspects, the decoupled here means that the AP-TRS and/or SP-TRS is not quasi-co-located (QCL'ed) with the P-TRS. The processor further pre-compensates the AP-TRS or the SP-TRS based on the determined Doppler shift pre-compensation value and transmits, using the transceiver, the pre-compensated AP-TRS or the pre-compensated SP-TRS to the UE.

In some aspects, the pre-compensated AP-TRS or the pre-compensated SP-TRS can be used by the UE for time and frequency synchronization with the base station.

In some aspects, the processor is further configured to transmit, using the transceiver, at least one of a Demodulation Reference Signal (DMRS) or a signal on a Physical Downlink Shared Channel (PDSCH) that is pre-compensated with the determined Doppler shift pre-compensation value.

In some aspects, the processor is further configured to transmit, using the transceiver, a Downlink Control Information (DCI) Format 1_1 or a DCI Format 1_2 to the UE to trigger the UE to measure the pre-compensated AP-TRS. In some aspects, the DCI Format 1_1 or the DCI Format 1_2 can include a Channel State Information (CSI) request field.

In some aspects, the processor is configured to transmit, using the transceiver, a single Downlink Control Information (DCI) to trigger a plurality of UEs to measure the pre-compensated AP-TRS or the pre-compensated SP-TRS. In some examples, the DCI can include at least one of a DCI Format 0_1, a DCI Format 0_2, a DCI Format 1_1, or a DCI Format 1_2 and the DCI can further include a group Radio Network Temporary Identifier (RNTI) associated with the plurality of the UEs. Additionally, or alternatively, the DCI includes at least one of a DCI Format 2_x, where x is one of 0, 1, 2, 3, 4, 5, 6, or other DCI Formats, and the DCI Format 2_x further includes a Cyclic Redundancy Check (CRC) scrambled with a Radio Network Temporary Identifier (RNTI). In some examples, the DCI further includes a plurality of blocks, each block of the DCI corresponds to one group of UEs in the plurality of UEs.

In some aspects, the processor is further configured to configure a plurality of UEs with substantially same Doppler shift values to be in an awake mode at same Discontinuous Reception (DRX) on duration timer. In some examples, the processor is further configured to configure the plurality of the UEs to measure a pre-compensated P-TRS or the pre-compensated SP-TRS that are transmitted before the DRX on duration timer.

In some aspects, the processor is further configured to transmit, using the transceiver, at least one of a Demodulation Reference Signal (DMRS) or a signal on a Physical Downlink Shared Channel (PDSCH). At least one quasi-colocation (QCL) parameter associated with the DMRS or the PDSCH is only common with the P-TRS of the base station.

In some aspects, the processor is further configured to transmit, using the transceiver, at least one of a Demodulation Reference Signal (DMRS) or a signal on a Physical Downlink Shared Channel (PDSCH). At least one quasi-colocation (QCL) parameter associate with the DMRS or the signal on PDSCH is common with the P-TRS of the base station and a second P-TRS of a second base station.

Some aspects of this disclosure relate to a method including determining, by a base station, a Doppler shift pre-compensation value associated with a user equipment (UE) in response to determining that the UE is moving with a speed greater than a threshold. The method further includes generating, by the base station, an aperiodic Tracking Reference Signal (AP-TRS) or a semi persistent TRS (SP-TRS) for the UE, where the AP-TRS or the SP-TRS is decoupled from a periodic TRS (P-TRS) generated by the base station. The method further includes pre-compensating, by the base station, the AP-TRS or the SP-TRS based on the determined Doppler shift pre-compensation value and transmitting, by the base station, the pre-compensated AP-TRS or the pre-compensated SP-TRS to the UE.

Some aspects of this disclosure relate to a non-transitory computer-readable medium storing instructions. When the instructions are executed by a processor of a base station, the instructions cause the processor to perform operations including, determining a Doppler shift pre-compensation value associated with a user equipment (UE) in response to determining that the UE is moving with a speed greater than a threshold. The operations further include generating an aperiodic Tracking Reference Signal (AP-TRS) or a semi persistent TRS (SP-TRS) for the UE, where the AP-TRS or the SP-TRS is decoupled from a periodic TRS (P-TRS) generated by the base station. The operations further includes pre-compensating the AP-TRS or the SP-TRS based on the determined Doppler shift pre-compensation value and transmitting the pre-compensated AP-TRS or the pre-compensated SP-TRS to the UE.

Some aspects of this disclosure relate to a user equipment (UE). The UE includes a transceiver configured to enable wireless communication with a base station and a processor communicatively coupled to the transceiver. The processor receives, using the transceiver and from the base station, an aperiodic Tracking Reference Signal (AP-TRS) or a semi persistent TRS (SP-TRS). The AP-TRS or the SP-TRS is decoupled from a periodic TRS (P-TRS) of the base station and the AP-TRS or the SP-TRS is pre-compensated with a Doppler shift pre-compensation value. The processor further uses the AP-TRS or the SP-TRS to perform time and frequency synchronization with the base station.

In some aspects, the processor is further configured to receive, using the transceiver and from the base station, at least one of a Demodulation Reference Signal (DMRS) or a signal on a Physical Downlink Shared Channel (PDSCH) that is pre-compensated with the determined Doppler shift pre-compensation value.

In some aspects, the processor is further configured to transmit, using the transceiver, an estimated Doppler shift value to the base station to be used for determining the Doppler shift pre-compensation value.

In some aspects, the processor is further configured to receive, using the transceiver and from the base station, a signal for triggering the UE to measure the AP-TRS or the SP-TRS. In some aspects, the signal includes a Downlink Control Information (DCI) Format 1_1 or a DCI Format 1_2 comprising a Channel State Information (CSI) request field.

Additionally, or alternatively, the signal includes a single Downlink Control Information (DCI) to trigger the UE and a plurality of UEs to measure the AP-TRS or the SP-TRS. In some aspects, the DCI includes at least one of a DCI Format 0_1, a DCI Format 0_2, a DCI Format 1_1, or a DCI Format 1_2 the DCI includes a group Radio Network Temporary Identifier (RNTI) associated with the plurality of the UEs. Alternatively, the DCI includes at least one of a DCI Format 2_x, where x is one of 0, 1, 2, 3, 4, 5, 6, or other DCI Formats, and the DCI Format 2_x includes a Cyclic Redundancy Check (CRC) scrambled with a group Radio Network Temporary Identifier (RNTI).

Some aspects of this disclosure relate to a method including receiving, by a user equipment (UE) and from the base station, an aperiodic Tracking Reference Signal (AP-TRS) or a semi persistent TRS (SP-TRS). The AP-TRS or the SP-TRS is decoupled from a periodic TRS (P-TRS) of the base station and the AP-TRS or the SP-TRS is pre-compensated with a Doppler shift pre-compensation value. The method further includes using, by the UE, the AP-TRS or the SP-TRS to perform time and frequency synchronization with the base station.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some aspects of this disclosure relate to apparatuses and methods for implementing mechanisms for a network to use Doppler shift pre-compensation values for communicating TRS to a UE and implementing mechanisms for triggering the UE to measure the Doppler shift pre-compensated TRS.

In some examples, the aspects of this disclosure can be performed by a network and/or a UE that operates according to Release 17 (Rel-17) new radio (NR) of 5$^{th}$ generation (5G) wireless technology for digital cellular networks as defined by 3rd Generation Partnership Project (3GPP). Additionally, or alternatively, the aspects of this disclosure can be performed by a network and/or a UE that operates according to the Release 15 (Rel-15) and Release 16 (Rel-16), or others. However, the aspects of this disclosure are not limited to these examples, and one or more mechanisms of this disclosure can be implemented by other network(s) and/or UE(s) for using Doppler shift pre-compensation values enhancing the UE's channel estimation.

Figure 1:
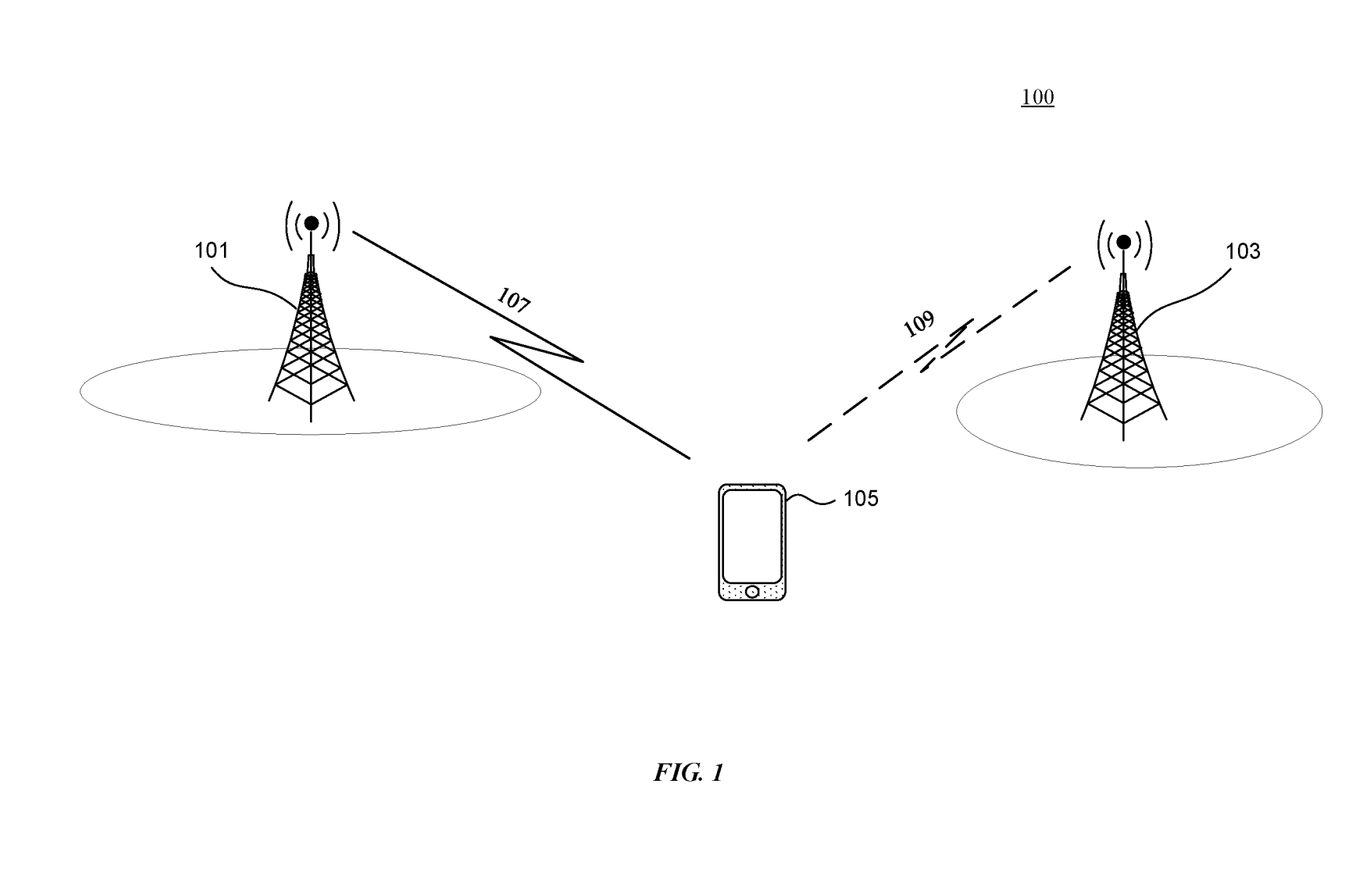
FIG. 1 illustrates an example system implementing mechanisms for a network to use Doppler shift pre-compensation values for communicating Tracking Reference Signal (TRS) to a user equipment (UE) and for triggering the UE to measure the Doppler shift pre-compensated TRS, according to some aspects of the disclosure.

FIG. 1 illustrates an example system 100 implementing mechanisms for a network to use Doppler shift pre-compensation values for communicating TRS to a UE and for triggering the UE to measure the Doppler shift pre-compensated TRS, according to some aspects of the disclosure. Example system 100 is provided for the purpose of illustration only and does not limit the disclosed aspects.

System 100 may include, but is not limited to, network nodes (for example, base stations such as eNBs, gNBs, TRPs, and the like) 101 and 103 and electronic device (for example, a UE) 105. Electronic device 105 (hereinafter referred to as UE 105) can include an electronic device configured to operate based on a wide variety of wireless communication techniques. These techniques can include, but are not limited to, techniques based on 3rd Generation Partnership Project (3GPP) standards. For example, UE 105 can include an electronic device configured to operate using Rel-17 or other. UE 105 can include, but is not limited to, as wireless communication devices, smart phones, laptops, desktops, tablets, personal assistants, monitors, televisions, wearable devices, Internet of Things (IoTs), vehicle's communication devices, and the like. Network nodes 101 and 103 (herein referred to as base stations or cells) can include nodes configured to operate based on a wide variety of wireless communication techniques such as, but not limited to, techniques based on 3GPP standards. For example, base stations 101 and 103 can include nodes configured to operate using Rel-17 or other.

According to some aspects, UE 105 can be connected to and can be communicating with base station 101 (e.g., the serving cell) using carrier 107. According to some aspects, carrier 107 can include one carrier. Additionally, or alternatively, carrier 107 can include two or more component carriers (CC). In other words, UE 105 can implement carrier aggregation (CA). For example, UE can use multiple carriers for communication with base station 101. According to some aspects, UE 105 can measure one or more carriers (e.g., carrier 107) used for communication with base station 101 (e.g., the serving cell) to determine channel quality information associated with carrier 107. Additionally, or alternatively, UE 105 can detect and measure one or more carriers (for example, carriers 109) associated with base station 103 (e.g., the neighbor cell) to determine channel quality information associated with carrier 109.

According to some aspects, UE 105 can be configured to move with a speed that is greater than a threshold. In a non-limiting example, UE 105 can by on a high speed train (HST) moving with a high speed (e.g., a speed that is greater than a threshold). In another non-limiting example, UE 105 can be on a satellite moving with a high speed (e.g., a speed that is greater than a threshold). Although some examples of this disclosure are discussed with respect to the HST, the aspects of this disclosure are not limited to HST and can include other high speed scenarios.

As discussed above, when UE 105 is moving with a high speed (e.g., a speed that is greater than a threshold), UE 105 can communicate with multiple base stations (e.g., base stations 101 and 103) during its movement. Because of the UE's movement, UE 105 will experience a frequency shift (e.g., a Doppler shift) in the signals that UE 105 receives from each of base stations 101 and 103. In some aspects, the Doppler shift can be a function of UE 105's speed and the carrier frequency of the signal used for the communication between UE 105 and base stations 101 and 103. The Doppler shift can result in changes in the channel between UE 105 and base stations 101 and 103.

The value of the Doppler shift and its sign (e.g., positive or negative Doppler shift) can depend on the location of UE 105 compared to base stations 101 and 103. For example, if UE 105 is moving away from base station 101, UE 105 can experience a negative Doppler shift value relative to base station 101. If UE 105 is moving toward base station 103, UE 105 can experience a positive Doppler shift value relative to base station 103. As a result, UE 105 can experience a composite Doppler shift relative to base stations 101 and 103. The Doppler shift experienced by UE 105 can result in poor channel estimation by UE 105.

According to some aspects, UE 105 can be configured to track two or more TRSs from two or more TRPs (e.g., base stations 101 and 103) to estimate two or more Doppler shift values. For example, UE 105 can estimate two separate Doppler shift values, one from each of base stations 101 and 103. UE 105 can use the estimated Doppler shift values in its channel estimation. Additionally, or alternatively, the network (e.g., base stations 101 and 103 and/or the network including base stations 101 and 103) can determine and use a Doppler shift pre-compensation value. In these examples, one or both of base stations 101 and 103 can send their signals to UE 105 compensated based on the determined Doppler shift pre-compensation value. In other words, one or both of base stations 101 and 103 apply the Doppler shift pre-compensation value as, for example, a frequency offset to the signals it transmits to UE 105. According to some aspects, base stations 101 and 103 can determine the Doppler shift pre-compensation value based on the signals (e.g., Channel State Information (CSI), uplink reference signal, or the like uplink signals) it receives from UE 105 and/or other UEs. Additionally, or alternatively, UE 105 can estimate a Doppler shift value and transmit the estimated Doppler shift value to base stations 101 and 103 (and/or the network that include base stations 101 and 103) for determining the Doppler shift pre-compensation value. Additionally, or alternatively, base stations 101 and 103 can use a predetermined value for the Doppler shift pre-compensation value. In the case where base stations 101 and 103 use the Doppler shift pre-compensation value for transmitting their signals, UE 105 does not experience (or experiences a substantially small) Doppler shift.

According to some aspects, the Doppler shift pre-compensation value is specific to a UE (e.g., UE 105) because the Doppler shift pre-compensation value can depend on parameters specific to the UE. For example, the Doppler shift pre-compensation value can depend on the UE 105's speed, the UE 105's location compared to base stations 101 and 103, or the like. In some examples, since the Doppler shift pre-compensation value is specific to the UE, the network needs to send different Tracking Reference Signals (TRSs) for different UEs. Each TRS is specific to the corresponding UE and is compensated using the Doppler shift pre-compensation value specific to the corresponding UE. However, in current 5G systems, the TRS is periodic and is shared with all UEs (no UE specific TRS is used).

The aspects of this disclosure are directed to methods and systems for TRS designs using Doppler shift pre-compensation value. For example, some aspects of this disclosure are directed to aperiodic TRS (AP-TRS) designs. Additionally, or alternatively, some aspects of this disclosure are directed to semi persistent TRS (SP-TRS) designs. Additionally, or alternatively, some aspects of this disclosure are directed to using two or more TRSs.

According to some aspects, base stations 101 and/or 103 (or the network including base stations 101 and 103) can generate an AP-TRS or a SP-TRS for each UE when the Doppler shift pre-compensation value is used by base stations 101 and/or 103. For example, base stations 101 and/or 103 (or the network including base stations 101 and 103) can determine a Doppler shift pre-compensation value for each UE within a plurality of UEs. Base stations 101 and/or 103 (or the network including base stations 101 and 103) can also generate an AP-TRS or a SP-TRS for each UE within the plurality of UEs. In other words, the AP-TRS (or the SP-TRS) can be UE specific, according to some aspects. In this example, each AP-TRS (or each SP-TRS) can be a standalone AP-TRS (or standalone SP-TRS). In other words, the AP-TRS (or the SP-TRS) is decoupled from a periodic TRS (P-TRS), and the AP-TRS (or the SP-TRS) is not quasi-co-located with the P-TRS. In a non-limiting example, the following restriction in 3GPP Technical Specification (TS) 38.214 can be removed:

For an aperiodic CSI-RS resource in a NZP-CSI-RS-ResourceSet configured with higher layer parameter trs-Info, the UE shall expect that a TCI-State indicates 'QCL-TypeA' with a periodic CSI-RS resource in a NZP-CSI-RS-ResourceSet configured with higher layer parameter trs-Info and, when applicable, 'QCL-TypeD' with the same periodic CSI-RS resource.

According to some aspects, SP-TRS has a periodicity, however, it can be active or inactive. In some examples, the SP-TRS is active when the base station (e.g., base stations 101 and/or 103) activates it. In some examples, the base station can activate SP-TRS in response to Medium Access Control (MAC) Control Element (MAC-CE). In a non-limiting example, the base station (e.g., base stations 101 and/or 103) can use SP-TRS for two UEs. The base station can activate the SP-TRS for the first UE. Then, the base station can activate the SP-TRS for the second UE. Next, the base station can activate the SP-TRS for the first UE. And so on.

According to some aspects, the AP-TRS (or the SP-TRS) are transmitted in a Single Frequency Network (SFN) manner. For example, two base stations 101 and 103 can transmit the same AP-TRS (or the same SP-TRS) but with different Doppler shift pre-compensation values. In a non-limiting example, base station 101 can transmit the AP-TRS (or the SP-TRS) using a first Doppler shift pre-compensation value. Base station 103 will transmit the same AP-TRS (or the same SP-TRS) using a second Doppler shift pre-compensation value. In some examples, the first and second Doppler shift pre-compensation values have different signs (e.g., one is positive and the other one is negative). Additionally, or alternatively, the first and second Doppler shift pre-compensation values have different absolute values based on UE 105's distance from each of base stations 101 and 103. Accordingly, UE 105 can receive a combined AP-TRS (or a combined SP-TRS) with reduced or minimum Doppler shift. In these examples, the combined AP-TRS (or the combined SP-TRS) can include the combination of the AP-TRS (or the SP-TRS) from base station 101 with the AP-TRS (or the SP-TRS) from base station 103.

According to some aspects, in addition to (or in alternative to) transmitting the AP-TRS (or the SP-TRS), base stations 101 and/or 103 (or the network including base stations 101 and 103) can transmit at least one of a Demodulation Reference Signal (DMRS) or a signal on a Physical Downlink Shared Channel (PDSCH) that is pre-compensated with the Doppler shift pre-compensation value. For example, base stations 101 and/or 103 (or the network including base stations 101 and 103) can transmit the DMRS and/or the signal on the PDSCH in the SFN manner. For example, base station 101 and 103 can transmit the same DMRS and/or the signal on the PDSCH but with different Doppler shift pre-compensation values. In a non-limiting example, base station 101 can transmit the DMRS and/or the signal on the PDSCH using a first Doppler shift pre-compensation value. Base station 103 can transmit the same DMRS and/or signal on the PDSCH using a second Doppler shift pre-compensation value. In some examples, the first and second Doppler shift pre-compensation values have different signs (e.g., one is positive and the other one is negative). Additionally, or alternatively, the first and second Doppler shift pre-compensation values have different absolute values based on the UE 105's distance from each of base stations 101 and 103.

In some examples, the DMRS and/or the signal on the PDSCH are quasi-co-located with an AP-TRS. In other words, a first channel for the DMRS and/or the PDSCH share one or more parameters with a second channel for the AP-TRS. Therefore, the one or more parameters of the first channel (for the DMRS and/or the PDSCH) represent the same parameter(s) for the second channel (for the AP-TRS). Additionally, or alternatively, the DMRS and/or the signal on the PDSCH are quasi-co-located with an SP-TRS. In other words, a first channel for the DMRS and/or the PDSCH share one or more parameters with a second channel for the SP-TRS. Therefore, the one or more parameters of the first channel (for the DMRS and/or the PDSCH) represent the same parameter(s) for the second channel (for the SP-TRS).

According to some aspects, the one or more parameters shared between DMRS and/or PDSCH with AP-TRS and/or SP-TRS can include one or more parameters associated with different types of quasi-colocation (QCL). In a non-liming example, the one or more parameters can include one or more parameters associated with QCL-Type A. For example, the one or more parameters can include one or more of a Doppler shift value, a Doppler spread value, an average delay value, a delay spread value. In another example, the one or more parameters can include one or more parameters associated with QCL-Type D. For example, the one or more parameters can include spatial filter parameter (e.g., to support beamforming). It is noted that the aspects of this disclosure are not limited to these examples, and the one or more parameters can include other parameters.

According to some aspects, base stations 101 and/or 103 (or the network including base stations 101 and 103) informs UE 105 that the DMRS and/or the signal on the PDSCH are quasi-co-located with an AP-TRS and/or with an SP-TRS. For example base stations 101 and/or 103 (or the network including base stations 101 and 103) can use one or more downlink data or downlink control signals to inform UE 105 that the DMRS and/or the signal on the PDSCH are quasi-co-located with an AP-TRS and/or with an SP-TRS.

According to some aspects, base station 101 (and/or base station 103) can trigger UE 105 to receive and/or measure the AP-TRS based on an uplink DCI. For example, DCI Format 0_1 and/or DCI Format 0_2 for each UE 105 can be used to trigger UE 105 to receive and/or measure the AP-TRS. In one example, a CSI request field in DCI Format 0_1 and/or DCI Format 0_2 can be used to trigger UE 105. In some examples, by sending DCI Format 0_1 and/or DCI Format 0_2, base station 101 (and/or base station 103) triggers UE 105 to measure the channel for the CSI report, and therefore UE 105 can measure the AP-TRS.

Additionally, or alternatively, base station 101 (and/or base station 103) can trigger UE 105 to receive and/or measure the AP-TRS based on a downlink DCI. For example, DCI Format 1_1 and/or DCI Format 1_2 can be used to trigger UE 105 to receive and/or measure AP-TRS. In some aspects, a CSI request field can be introduced in DCI Format 1_1 and/or DCI Format 1_2. The CSI request field can only be used to trigger CSI without report quantity (e.g., reportQuantity is set as none in CSI-ReportConfig), according to some aspects. In this example, by sending DCI Format 1_1 and/or DCI Format 1_2, base station 101 (and/or base station 103) can allocate downlink resources for PDSCH and also can trigger UE 105 to measure the AP-TRS.

According to some aspects, in addition to (or in alternative to) using one DCI per UE, base station 101 (and/or base station 103) can use one DCI to trigger a plurality of UEs to receive and/or measure AP-TRS or SP-TRS. For example, base station 101 (and/or base station 103) can use on DCI to trigger the plurality of UEs to receive and/or measure AP-TRS or SP-TRS simultaneously or substantially simultaneously. In a non-limiting example, the plurality of UEs can be on a high speed train (HST). If base station 101 (and/or base station 103) determines that one of the plurality of UEs is to be triggered to measure AP-TRS or SP-TRS, base station 101 (and/or base station 103) can determine that rest of the plurality of UEs on the HST (and/or one or more cabins on the HST) are also to be triggered to measure AP-TRS or SP-TRS. Therefore, bases station 101 (and/or base station 103) can use a single DCI to trigger the UEs, according to some aspects.

In some aspects, base station 101 (and/or base station 103) can use a group Radio Network Temporary Identifier (RNTI) and one or more of DCI Format 0_1, 0_2, 1_1, or 1_2 to send a single DCI for triggering the plurality of UEs to measure the AP-TRS or SP-TRS. For example, base station 101 (base station 103 and/or the network including base stations 101 and 103) can assign the group RNTI (e.g., AP-TRS-RNTI or SP-TRS-RNTI) to the plurality of UEs. In the non-limiting example of the plurality of UEs on a HST, base station 101 (base station 103 and/or the network including base stations 101 and 103) can assign the group RNTI to the plurality of UEs before the UEs get on the HST. In some examples, base station 101 (and/or base station 103) can use the group RNTI to scramble the CRC of the DCI that base station 101 (and/or base station 103) transmits to the UEs. Each of the UEs can descramble the CRC using their assigned group RNTI. By receiving the DCI and/or by detecting that the CRC is scrambled using the group RNTI, UE 105 can be triggered to measure the AP-TRS or SP-TRS. In some examples, only a limited subset of the DCI fields are valid. In a non-limiting example, only the CSI request is valid. In some examples, certain field of the DCI is indicated as reserved/fix value for DCI validation.

According to some aspects, when SP-TRS is used, the uplink DCI (e.g., DCI Format 0_1 and/or DCI Format 0_2) can reuse the CSI request field to indicate a SP-TRS identifier (ID). Additionally, or alternatively, the downlink DCI (e.g., DCI Format 1_1 and/or DCI Format 1_2) can introduce a CSI request field to indicate the SP-TRS identifier (ID). According to some aspects, when SP-TRS is used, the group RNTI (e.g., the SP-TRS-RNTI), which allows the plurality of UEs to decode the same DCI can also be used to decode the same MAC-CE that activates the SP-TRS.

In some aspects, base station 101 (and/or base station 103) can use the group RNTI and one or more of DCI Format 2_0, 2_1, 2_2, 2_3, 2_4, 2_5, 2_6, or other DCI Formats to send a single DCI for triggering the plurality of UEs to measure the AP-TRS or SP-TRS. For example, base station 101 (base station 103 and/or the network including base stations 101 and 103) can assign the group RNTI (e.g., AP-TRS-RNTI or SP-TRS-RNTI) to the plurality of UEs. In some examples, base station 101 (and/or base station 103) can use the group RNTI to scramble the CRC of the DCI that base station 101 (and/or base station 103) transmits to the UEs. Each of the UEs can descramble the CRC using their assigned group RNTI. By receiving the DCI and/or by detecting that the CRC is scrambled using the group RNTI, UE 105 can be triggered to measure AP-TRS or SP-TRS.

According to some aspects, the DCI (e.g., the DCI Format 2_x, where x is 0, 1, 2, 3, 4, 5, 6, or other DCI Formats) can include a plurality of blocks. For example, one or more fields of the DCI can include the plurality of blocks. In this example, each block of the DCI can correspond to one group of the plurality of UEs. In non-limiting example, the DCI can include four blocks and the plurality of UEs can be divided in four groups. Each of the four blocks of the DCI can correspond to one group of the four groups. According to some aspects, each UE 105 can be configured with the group RNTI and its block location. Therefore, each UE 105 can detect and decode its corresponding block of the DCI, and can thus be triggered to measure AP-TRS or SP-TRS. In some examples, each block of the DCI can include the CSI request field to trigger UE 105 to measure AP-TRS or SP-TRS.

According to some aspects, the TRS operation can be enhanced using CDRX (Connected Mode DRX (Discontinuous Reception)) operation. For example, the same P-TRS or SP-TRS can be shared by a plurality of UEs using the CDRX configuration. According to some aspects, DRX is a mechanism that lets UE 105 to be in sleep mode for a first period of time and lets UE 105 to be in awake mode for a second period of time. The network (e.g., base stations 101 and/or 103) can communicate the parameters of the DRX operation (e.g., the timings and periods for the sleep mode and the awake mode) to UE 105. In some examples, the network (e.g., base stations 101 and/or 103) can use Radio Resource Control (RRC) message(s) (e.g., RRC connection setup and/or reconfiguration) to communicate the parameters of the DRX operation to UE 105. In some examples, DRX Cycle (e.g., the duration of one "ON time" plus one "OFF time") and DRX on duration timer (e.g., the duration of "ON time" within one DRX cycle) are some the of the parameters of the DRX operation.

Figure 3:
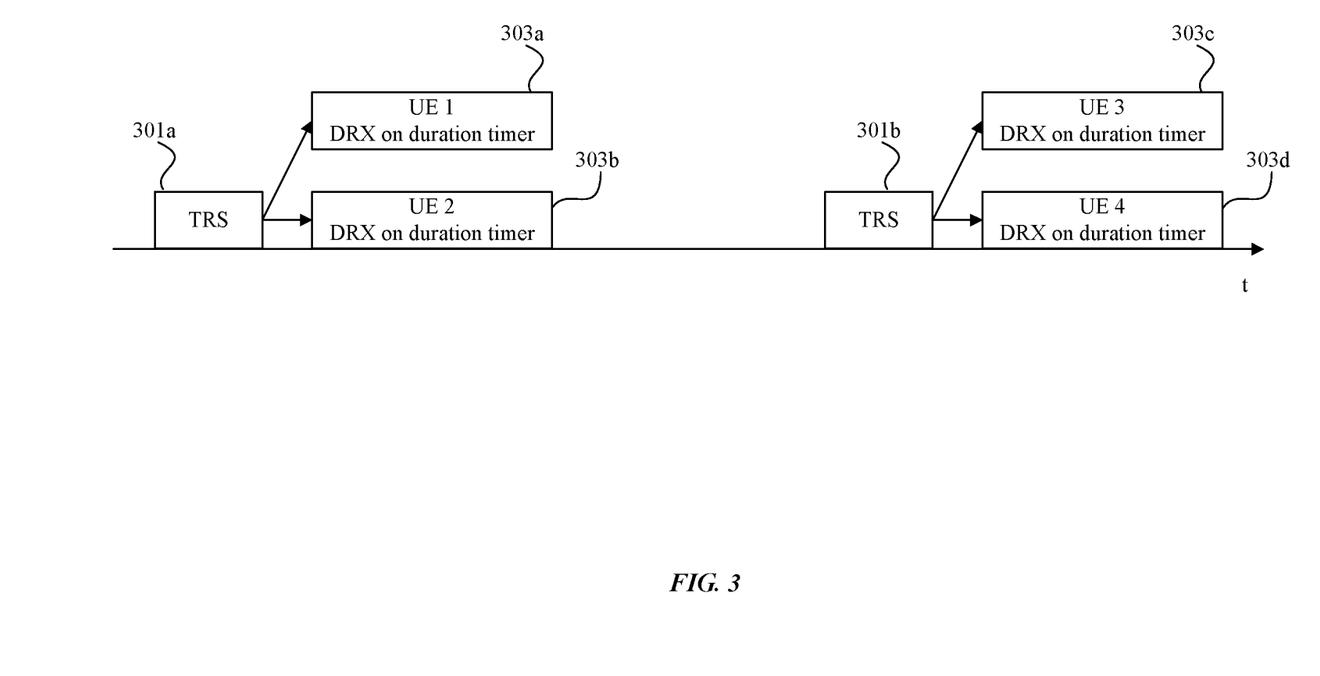
FIG. 3 illustrates one exemplary TRS operation with CDRX operation, according to some aspects of this disclosure.

According to some aspects, a plurality of UEs with the same or substantially the same Doppler shift can be configured to wake up at the same time. In this example, these UEs will have the same DRX on duration timer (and/or the same CDRX on duration timer). Before each CDRX on duration timer, or a subset of CDRX on duration timer, (or each DRX on duration timer, or a subset of DRX on duration timer), base station 101 (base station 103 and/or the network including base stations 101 and 103) can configure UE 105 to measure the P-TRS or SP-TRS transmitted before the CDRX on duration timer (or the DRX on duration timer). In this example, UE 105 can ignore the TRS transmitted in other times. According to some aspects, the location of the P-TRS or SP-TRS can be based on a slot/time offset compared to the CDRX on duration time (or the CRX on duration timer), the closest TRS, or the like. In other words, the same P-TRS or AP-TRS can be used for a plurality of UEs and the CDRX (or DRX) operation can be used for triggering the plurality of UEs to measure the P-TRS or AP-TRS. FIG. 3 illustrates one exemplary TRS operation with CDRX operation, according to some aspects of this disclosure.

As illustrated in FIG. 3, TRS 301a (e.g., P-TRS or AP-TRS) are transmitted for a first UE (UE 1) and a second UE (UE 2) before their corresponding DRX on duration timer 303a and 303b (or CDRX on duration timer, or a subset of DRX on duration timer). Similarly, TRS 301b (e.g., P-TRS or AP-TRS) are transmitted for a third UE (UE 3) and a fourth UE (UE 4) before their corresponding DRX on duration timer 303c and 303d (or CDRX on duration timer, or a subset of DRX on duration timer).

According to some aspects, UE 105 can receive two TRSs (e.g., P-TRSs) from two TRPs (e.g., base stations 101 and 103). For example, UE 105 can receive a first TRS (e.g., P-TRS) from base station 101 (e.g., a first TRP) and a second TRS (e.g., P-TRS) from base station 103 (e.g., a second TRP). In some examples, both of base stations 101 and 103 can apply the Doppler shift pre-compensation value to their respective TRSs. Alternatively, one of base stations 101 and 103 applies the Doppler shift pre-compensation value to its TRS. In some examples, the DMRS and/or the signal on the PDSCH can be quasi-co-located with the two TRSs (e.g., two Transmission Configuration Indication (TCI) states). In other words, a channel for the DMRS and/or the PDSCH can share one or more parameters with a channel for each of the two TRSs. Therefore, the one or more parameters of the channel (for the DMRS and/or the PDSCH) are common with one or more parameter(s) for the channel (for the TRSs). In some examples, the one or more parameters can include QCL properties. For example, the one or more parameters can include one or more of a Doppler shift value, a Doppler spread value, an average delay value, a delay spread value, and spatial receiver parameter.

According to some aspects, for each of the five QCL properties (e.g., Doppler shift value, Doppler spread value, average delay value, delay spread, spatial receiver parameter), the DMRS/PDSCH is only quasi-co-located to one TRS. In other words, one or more of the QCL properties of the DMRS/PDSCH can be common only to one TRS. Additionally, or alternatively, for each of the five QCL properties (e.g., Doppler shift value, Doppler spread value, average delay value, delay spread, spatial receiver parameter), DMRS/PDSCH is quasi-co-located to both TRSs. In other words, one or more of the QCL properties of the DMRS/PDSCH can be common to both TRSs. Therefore, 32 different options can exist as each QCL property of DMRS/PDSCH can have 2 option—common to only one TRS or common to both TRSs, according to some aspects.

Table 1 below provides some examples of the 32 different options discussed above.

TABLE 1

| Three Examples of DMRS/PDSCH QCL to TRS 1 and TRS 2 | | | |
|---|---|---|---|
| | TRS 1 | TRS 2 | NOTE |
| DMRS/PDSCH QCL Assumption to TRS 1 and TRS 2 | Doppler shift value, Doppler spread value, average delay value, delay spread value | Doppler shift value, Doppler spread value, average delay value, delay spread value | This assumes that both TRS applies the Doppler shift compensation |
| | Doppler shift value, Doppler spread value, average delay value, delay spread value | Doppler spread value, average delay value, delay spread value | This assumes that (1) TRS 1 does not, but (2) TRS 2 does, apply the Doppler shift compensation |
| | Doppler shift value, Doppler spread value, average delay value, delay spread value | average delay value, delay spread value | This assumes that (1) TRS 1 does not, but (2) TRS 2 does, apply the Doppler shift compensation |

The first row of Table 1 illustrates one example where for four QCL properties (Doppler shift value, Doppler spread value, average delay value, delay spread value), the DMRS/PDSCH is quasi-co-located to both TRSs (e.g., TRS 1 and TRS 2). In other words, the DMRS/PDSCH and the both TRSs have these four QCL properties in common. In this example, base stations 101 and 103 apply the Doppler shift compensation value to their corresponding TRSs.

The second row of Table 1 illustrates one example where for four QCL properties (Doppler shift value, Doppler spread value, average delay value, delay spread value), the DMRS/PDSCH is quasi-co-located to TRS 1. In this example, for three QCL properties (Doppler spread value, average delay value, delay spread value), the DMRS/PDSCH is quasi-co-located to TRS 2. In this example, base station 101 (e.g., the TRP 1) does not apply the Doppler shift compensation value to TRS 1. In this example, base station 103 (e.g., the TRP 2) applies the Doppler shift compensation value to TRS 2.

The third row of Table 1 illustrates one example where for four QCL properties (Doppler shift value, Doppler spread value, average delay value, delay spread value), the DMRS/PDSCH is quasi-co-located to TRS 1. In this example, for two QCL properties (average delay value and delay spread value), the DMRS/PDSCH is quasi-co-located to TRS 2. In this example, base station 101 (e.g., the TRP 1) does not apply the Doppler shift compensation value to TRS 1. In this example, base station 103 (e.g., the TRP 2) applies the Doppler shift compensation value to TRS 2.

According to some aspects, UE 105 can use the received P-TRS, the received AP-TRS, and/or the received SP-TRS to perform channel estimation and/or synchronization. For example, UE 105 can use the received P-TRS, the received AP-TRS, and/or the received SP-TRS to perform time and/or frequency synchronization with base station 101 and/or 103.

Figure 2:
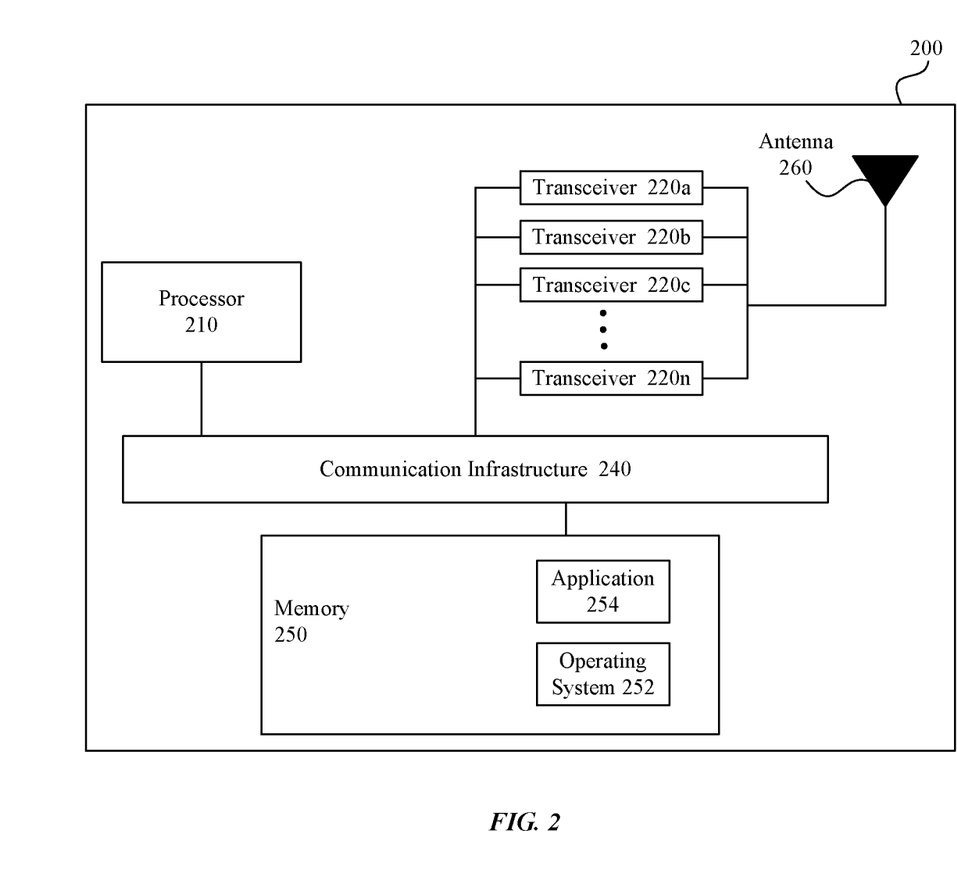
FIG. 2 illustrates a block diagram of an example system of an electronic device implementing mechanisms for using Doppler shift pre-compensation values for communicating TRS and/or for measuring the Doppler shift pre-compensated TRS, according to some aspects of the disclosure.

FIG. 2 illustrates a block diagram of an example system 200 of an electronic device implementing mechanisms for using Doppler shift pre-compensation values for communicating TRS and/or measuring the Doppler shift pre-compensated TRS, according to some aspects of the disclosure. System 200 may be any of the electronic devices (e.g., base stations 101, 103, UE 105) of system 100. System 200 includes processor 210, one or more transceivers 220a-220n, communication infrastructure 240, memory 250, operating system 252, application 254, and antenna 260. Illustrated systems are provided as exemplary parts of system 200, and system 200 can include other circuit(s) and subsystem(s). Also, although the systems of system 200 are illustrated as separate components, the aspects of this disclosure can include any combination of these, less, or more components.

Memory 250 may include random access memory (RAM) and/or cache, and may include control logic (e.g., computer software) and/or data. Memory 250 may include other storage devices or memory such as, but not limited to, a hard disk drive and/or a removable storage device/unit. According to some examples, operating system 252 can be stored in memory 250. Operating system 252 can manage transfer of data from memory 250 and/or one or more applications 254 to processor 210 and/or one or more transceivers 220a-220n. In some examples, operating system 252 maintains one or more network protocol stacks (e.g., Internet protocol stack, cellular protocol stack, and the like) that can include a number of logical layers. At corresponding layers of the protocol stack, operating system 252 includes control mechanism and data structures to perform the functions associated with that layer.

According to some examples, application 254 can be stored in memory 250. Application 254 can include applications (e.g., user applications) used by wireless system 200 and/or a user of wireless system 200. The applications in application 254 can include applications such as, but not limited to, Siri™, FaceTime™, radio streaming, video streaming, remote control, and/or other user applications.

System 200 can also include communication infrastructure 240. Communication infrastructure 240 provides communication between, for example, processor 210, one or more transceivers 220a-220n, and memory 250. In some implementations, communication infrastructure 240 may be a bus. Processor 210 together with instructions stored in memory 250 performs operations enabling system 200 of system 100 to implement mechanisms for using Doppler shift pre-compensation values for communicating TRS and for triggering the UE to measure the Doppler shift pre-compensated TRS, as described herein. Additionally, or alternatively, one or more transceivers 220a-220n perform operations enabling system 200 of system 100 to implement mechanisms for using Doppler shift pre-compensation values for communicating TRS and for triggering the UE to measure the Doppler shift pre-compensated TRS, as described herein.

Processor 210 together with instructions stored in memory 250 performs operations enabling system 200 of system 100 to implement mechanisms for measuring the Doppler shift pre-compensated TRS and using the measured Doppler shift pre-compensated TRS for time and frequency synchronization, as described herein. Additionally, or alternatively, one or more transceivers 220a-220n perform operations enabling system 200 of system 100 to implement mechanisms for measuring the Doppler shift pre-compensated TRS and using the measured Doppler shift pre-compensated TRS for time and frequency synchronization, as described herein.

One or more transceivers 220a-220n transmit and receive communications signals that support mechanisms for using Doppler shift pre-compensation values for communicating TRS, for triggering the UE to measure the Doppler shift pre-compensated TRS, according to some aspects, and may be coupled to antenna 260. Additionally, or alternatively, one or more transceivers 220a-220n transmit and receive communications signals that support mechanisms for measuring the Doppler shift pre-compensated TRS and using the measured Doppler shift pre-compensated TRS for time and frequency synchronization, according to some aspects. Antenna 260 may include one or more antennas that may be the same or different types. One or more transceivers 220a-220n allow system 200 to communicate with other devices that may be wired and/or wireless. In some examples, one or more transceivers 220a-220n can include processors, controllers, radios, sockets, plugs, buffers, and like circuits/devices used for connecting to and communication on networks. According to some examples, one or more transceivers 220a-220n include one or more circuits to connect to and communicate on wired and/or wireless networks.

According to some aspects, one or more transceivers 220a-220n can include a cellular subsystem, a WLAN subsystem, and/or a Bluetooth™ subsystem, each including its own radio transceiver and protocol(s) as will be understood by those skilled arts based on the discussion provided herein. In some implementations, one or more transceivers 220a-220n can include more or fewer systems for communicating with other devices.

In some examples, one or more transceivers 220a-220n can include one or more circuits (including a WLAN transceiver) to enable connection(s) and communication over WLAN networks such as, but not limited to, networks based on standards described in IEEE 802.11. Additionally, or alternatively, one or more transceivers 220a-220n can include one or more circuits (including a Bluetooth™ transceiver) to enable connection(s) and communication based on, for example, Bluetooth™ protocol, the Bluetooth™ Low energy protocol, or the Bluetooth™ low energy long range protocol. For example, transceiver 220n can include a Bluetooth™ transceiver.

Additionally, one or more transceivers 220a-220n can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like. For example, one or more transceivers 220a-220n can be configured to operate according to one or more of Rel-15, Rel-16, Rel-17, or other of the 3GPP standards.

According to some aspects, processor 210, alone or in combination with computer instructions stored within memory 250, and/or one or more transceiver 220a-220n, implements mechanisms for using Doppler shift pre-compensation values for communicating TRS and for triggering the UE to measure the Doppler shift pre-compensated TRS, as discussed herein. Additionally, or alternatively, processor 210, alone or in combination with computer instructions stored within memory 250, and/or one or more transceiver 220a-220n, implements mechanisms for measuring the Doppler shift pre-compensated TRS and using the measured Doppler shift pre-compensated TRS for time and frequency synchronization, as discussed herein. For example, transceiver 220a can enable connection(s) and communication over a first carrier (for example, carrier 107 of FIG. 1). In this example, transceiver 220a and/or transceiver 220b can enable detecting and/or measuring a second carrier (for example, carrier 109 of FIG. 1). Additionally, or alternatively, wireless system 200 can include one transceiver configured to operate at different carriers. Processor 210 can be configured to control the one transceiver to switch between different carriers, according to some examples. Although the operations discussed herein are discussed with respect to processor 210, it is noted that processor 210, alone or in combination with computer instructions stored within memory 250, and/or one or more transceiver 220a-220n, can implement these operations.

Figure 4A:
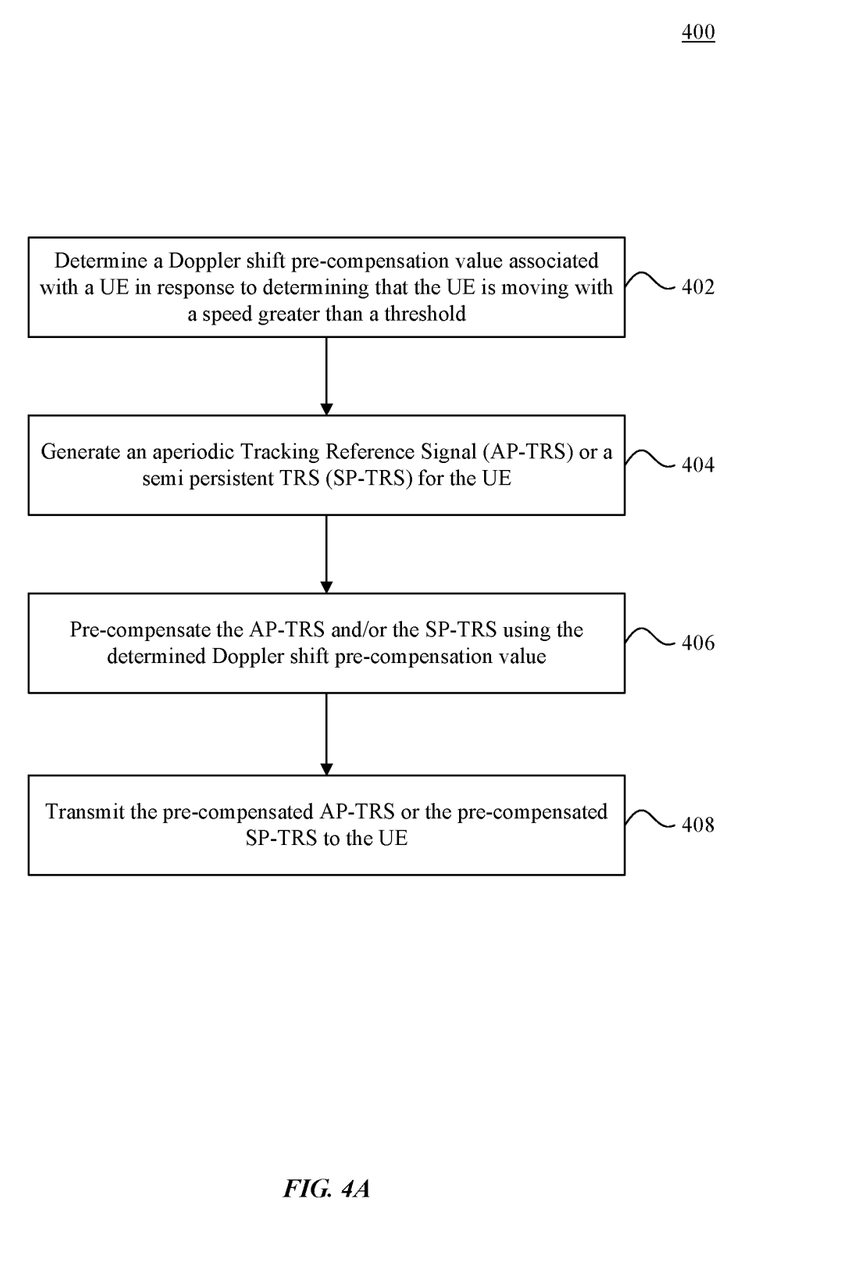
FIG. 4A illustrates an example method for a system (for example, a base station) supporting mechanisms for using Doppler shift pre-compensation values for communicating TRS to a UE and for triggering the UE to measure the Doppler shift pre-compensated TRS, according to some aspects of the disclosure.

FIG. 4A illustrates an example method for a system (for example, a base station) supporting mechanisms for using Doppler shift pre-compensation values for communicating TRS to a UE and for triggering the UE to measure the Doppler shift pre-compensated TRS, according to some aspects of the disclosure. As a convenience and not a limitation, FIG. 4A may be described with regard to elements of FIGS. 1-3. Method 400 may represent the operation of an electronic device (for example, base station 101 and/or 103 of FIG. 1) implementing mechanisms for communicating TRS to a UE and for triggering the UE to measure the Doppler shift pre-compensated TRS. Method 400 may also be performed by system 200 of FIG. 2 and/or computer system 500 of FIG. 5. But method 400 is not limited to the specific aspects depicted in those figures and other systems may be used to perform the method as will be understood by those skilled in the art. It is to be appreciated that not all operations may be needed, and the operations may not be performed in the same order as shown in FIG. 4A.

At 402, a Doppler shift pre-compensation value associated with a UE is determined. For example, base station 101 and/or 103 can determine the Doppler shift pre-compensation value associated with UE 105. According to some aspects, base stations 101 and/or 103 can determine the Doppler shift pre-compensation value based on the signals (e.g., CSI, uplink reference signal(s), or the like uplink signals) it receives from UE 105 and/or other UEs. Additionally, or alternatively, determining the Doppler shift pre-compensation value can include receiving an estimated value of the Doppler shift value from UE. In this example, UE 105 can estimate a Doppler shift value and can transmit the estimated Doppler shift value to base stations 101 and 103 (and/or the network that include base stations 101 and 103). Base station 101 and/or 103 can determine the Doppler shift pre-compensation value based on the received Doppler shift value. Additionally, or alternatively, determining the Doppler shift pre-compensation value can include using a predetermined value for the Doppler shift pre-compensation value.

According to some aspects, base station 101 and/or 103 can determine the Doppler shift pre-compensation value in response to determining that the UE (e.g. UE 105) is moving with a speed greater than a threshold. In one example, base station 101 and/or 103 can determine that the UE is moving with a speed greater than the threshold based on one or more uplink signals that base station 101 and/or 103 receives from the UE. The aspects of this disclosure are not limited to these examples, and base station 101 and/or 103 can determine that the UE is moving using other methods.

At 404, an aperiodic Tracking Reference Signal (AP-TRS) or a semi persistent TRS (SP-TRS) for the UE is generated. For example, base station 101 and/or 103 generates the AP-TRS and/or the SP-TRS for the UE. In some examples, the AP-TRS and/or the SP-TRS are specific for a UE. In some examples, the AP-TRS and/or the SP-TRS are specific for a plurality of UEs. According to some aspects, the AP-TRS and/or the SP-TRS is decoupled from a periodic TRS (P-TRS) generated by base station 101 and/or 103. For example, the AP-TRS and/or the SP-TRS can be a standalone AP-TRS and/or a standalone SP-TRS. In other words, the AP-TRS and/or the SP-TRS is not quasi-co-located with the P-TRS.

At 406, the AP-TRS and/or the SP-TRS is pre-compensated using the determined Doppler shift pre-compensation value. For example, base station 101 and/or 103 can pre-compensate the AP-TRS and/or the SP-TRS using the determined Doppler shift pre-compensation value. In some examples, base station 101 and/or 103 applies the determined Doppler shift pre-compensation value as, for example, a frequency offset to the AP-TRS and/or the SP-TRS before base station 101 and/or 103 transmits the pre-compensated AP-TRS and/or SP-TRS to UE 105.

At 408, the pre-compensated AP-TRS and/or the pre-compensated SP-TRS is transmitted to the UE. For example, base station 101 and/or 103 transmits the pre-compensated AP-TRS or the pre-compensated SP-TRS to UE 105. In other words, base station 101 and/or 103 can transmit the Doppler-compensated AP-TRS or the SP-TRS to UE 105, based on the determined Doppler shift pre-compensation value. In some aspects, pre-compensation of operation 406 can be part of generation operation 404. Additionally, or alternatively, pre-compensation of operation 406 can be part of transmission operation 408.

According to some aspects, method 400 can further include transmitting at least one of a Demodulation Reference Signal (DMRS) or a signal on a Physical Downlink Shared Channel (PDSCH) that is pre-compensated with the determined Doppler shift pre-compensation value. In some examples, transmitting the DMRS and/or the signal on the PDSCH can include transmitting the DMRS and/or the signal on the PDSCH to UE 105 pre-compensated based on the determined Doppler shift pre-compensation value. In other words, base station 101 and/or 103 applies the determined Doppler shift pre-compensation value as, for example, a frequency offset to the DMRS and/or the signal on the PDSCH that base station 101 and/or 103 transmits to UE 105.

According to some aspects, method 400 can further include triggering the UE (e.g., UE 105) to receive the pre-compensated AP-TRS and/or the pre-compensated SP-TRS. In some examples, base station 101 and/or 103 can transmit a DCI Format 1_1 or a DCI Format 1_2 to the UE to trigger the UE to measure the pre-compensated AP-TRS and/or the pre-compensated SP-TRS. In some examples, the DCI Format 1_1 or the DCI Format 1_2 can include a CSI request field. The CSI request field can only be used to trigger CSI without report quantity, according to some aspects.

According to some aspects, method 400 can include operations for triggering a plurality of UEs to measure the pre-compensated AP-TRS and/or the pre-compensated SP-TRS. For example, method 400 can include transmitting a single DCI to trigger the plurality of UEs to measure the pre-compensated AP-TRS and/or the pre-compensated SP-TRS. In some aspects, the DCI is at least one of a DCI Format 0_1, a DCI Format 0_2, a DCI Format 1_1, or a DCI Format 1_2 and the DCI includes a group Radio Network Temporary Identifier (RNTI) associated with the plurality of the UEs. Additionally, or alternatively, the DCI is at least one of a DCI Format 2_x, wherein x is one of 0, 1, 2, 3, 4, 5, or 6, and the DCI Format 2_x includes a CRC scrambled with the group RNTI. In some examples, the DCI can further include a plurality of blocks, each block of the DCI corresponds to one group of UEs in the plurality of UEs.

According to some aspects, method 400 can further include using CDRX operation with the TRS operation. In some examples, method 400 can include configuring a plurality of UEs with substantially same Doppler shift values to be in an awake mode substantially at same DRX on duration timer. Additionally, method 400 can include configuring the plurality of the UEs to measure the P-TRS (and/or pre-compensated P-TRS) or the pre-compensated SP-TRS that are transmitted before the DRX on duration timer.

According to some aspects, method 400 can further include using two TRSs. In some examples, method 400 can include transmitting at least one of a DMRS or a signal on a PDSCH, where at least one quasi-colocation (QCL) parameter associated with the DMRS or the PDSCH is only common with the P-TRS of base station 101. In some aspects, the DMRS and/or the signal on the PDSCH are pre-compensated using the determined Doppler shift pre-compensation value before the DMRS and/or the signal on the PDSCH are transmitted. Alternatively, method 400 can include transmitting at least one of a DMRS or a signal on a PDSCH, where at least one quasi-colocation (QCL) parameter associated with the DMRS or the PDSCH is common with the P-TRS of base station 101 and with a P-TRS of base station 103. In some aspects, the DMRS and/or the signal on the PDSCH are pre-compensated using the determined Doppler shift pre-compensation value before the DMRS and/or the signal on the PDSCH are transmitted.

Figure 4B:
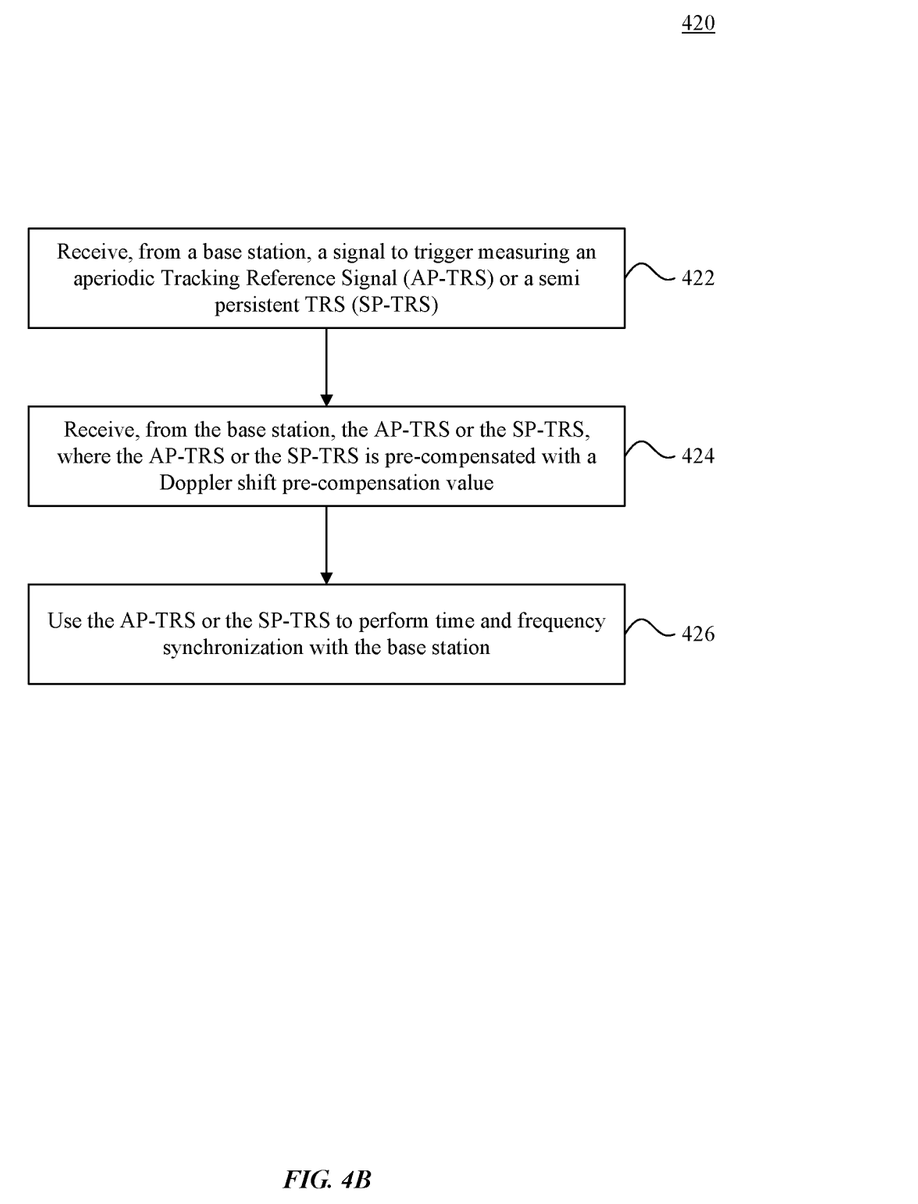
FIG. 4B illustrates an example method for a system (for example, a UE) supporting mechanisms for receiving and measuring the Doppler shift pre-compensated TRS, according to some aspects of the disclosure.

FIG. 4B illustrates an example method for a system (for example, a UE) supporting mechanisms for receiving and measuring the Doppler shift pre-compensated TRS, according to some aspects of the disclosure. As a convenience and not a limitation, FIG. 4B may be described with regard to elements of FIGS. 1-3. Method 420 may represent the operation of an electronic device (for example, UE 105 of FIG. 1) implementing mechanisms for receiving and measuring the Doppler shift pre-compensated TRS. Method 420 may also be performed by system 200 of FIG. 2 and/or computer system 500 of FIG. 5. But method 420 is not limited to the specific aspects depicted in those figures and other systems may be used to perform the method as will be understood by those skilled in the art. It is to be appreciated that not all operations may be needed, and the operations may not be performed in the same order as shown in FIG. 4B.

At 422, a signal to trigger measuring an AP-TRS or an SP-TRS is received. For example, the UE (e.g., UE 105) can receive a signal from the base station (e.g., base station 101 and/or 103). The signal can trigger the UE to measure the AP-TRS or the SP-TRS. According to some aspects, the signal can include a DCI Format 1_1 and/or DCI Format 1_2. For example, a CSI request field can be introduced in DCI Format 1_1 and/or DCI Format 1_2 to trigger the UE to measure the AP-TRS or SP-TRS.

In some aspects, the UE can be part of a plurality of UEs. The signal to trigger the UE to measure the AP-TRS or the SP-TRS can include one or more of DCI Format 0_1, 0_2, 1_1, or 1_2. In some examples, a group RNTI is used to scramble the CRC of the DCI that the base station 101 transmits to the UE. The UE can descramble the CRC using its assigned group RNTI. By receiving the DCI and/or by detecting that the CRC is scrambled using the group RNTI, the UE can be triggered to measure the AP-TRS or SP-TRS.

In some examples, the signal to trigger the UE to measure the AP-TRS or the SP-TRS can include at least one of a DCI Format 2_x, where x is one of 0, 1, 2, 3, 4, 5, or 6, and the DCI Format 2_x includes a CRC scrambled with the group RNTI. In some examples, the DCI can further include a plurality of blocks, each block of the DCI corresponds to one group of UEs in the plurality of UEs. According to some aspects, the UE can be configured with the group RNTI and its block location. Therefore, the UE can detect and decode its corresponding block of the DCI, and can thus be triggered to measure the AP-TRS or the SP-TRS.

According to some aspects, CDRX (or DRX) operation can be used to trigger the UE to measure a P-TRS or the SP-TRS. In some aspects, the UE can receive the parameters of the DRX operation (e.g., the timings and periods for the sleep mode and the awake mode) from the network. For example, the UE can receive these parameters using RRC message(s) (e.g., RRC connection setup and/or reconfiguration). According to some aspects, the UE can be configured to measure the P-TRS or SP-TRS transmitted before each CDRX on duration timer, or a subset of CDRX on duration timer, (or each DRX on duration timer, or a subset of DRX on duration timer), At 424, the AP-TRS or the SP-TRS is received. For example, the UE (e.g., UE 105) receives the AP-TRS or the SP-TRS from the base station (e.g., base station 101 and/or 103). The AP-TRS or the SP-TRS is pre-compensated with a Doppler shift pre-compensation value. According to some aspects, method 420 can include determining and transmitting an estimated value of the Doppler shift value. For example, the UE can determine the estimated value of the Doppler shift value and can transmit the estimated Doppler shift value to base stations 101 and 103 (and/or the network that include base stations 101 and 103). Base station 101 and/or 103 can determine the Doppler shift pre-compensation value based on the received Doppler shift value.

At 426, the AP-TRS or the SP-TRS is used to perform time and/or frequency synchronization with the base station. For example, the UE (e.g., UE 105) can use the received AP-TRS or SP-TRS (which was pre-compensated with a Doppler shift pre-compensation value) to perform time and/or frequency synchronization with the base station (e.g., base station 101 and/or 103).

According to some aspects, method 420 can further include receiving at least one of a Demodulation Reference Signal (DMRS) or a signal on a Physical Downlink Shared Channel (PDSCH) that is pre-compensated with the determined Doppler shift pre-compensation value. In some examples, receiving the DMRS and/or the signal on the PDSCH can include the UE receiving the DMRS and/or the signal on the PDSCH pre-compensated based on the determined Doppler shift pre-compensation value.

Figure 5:
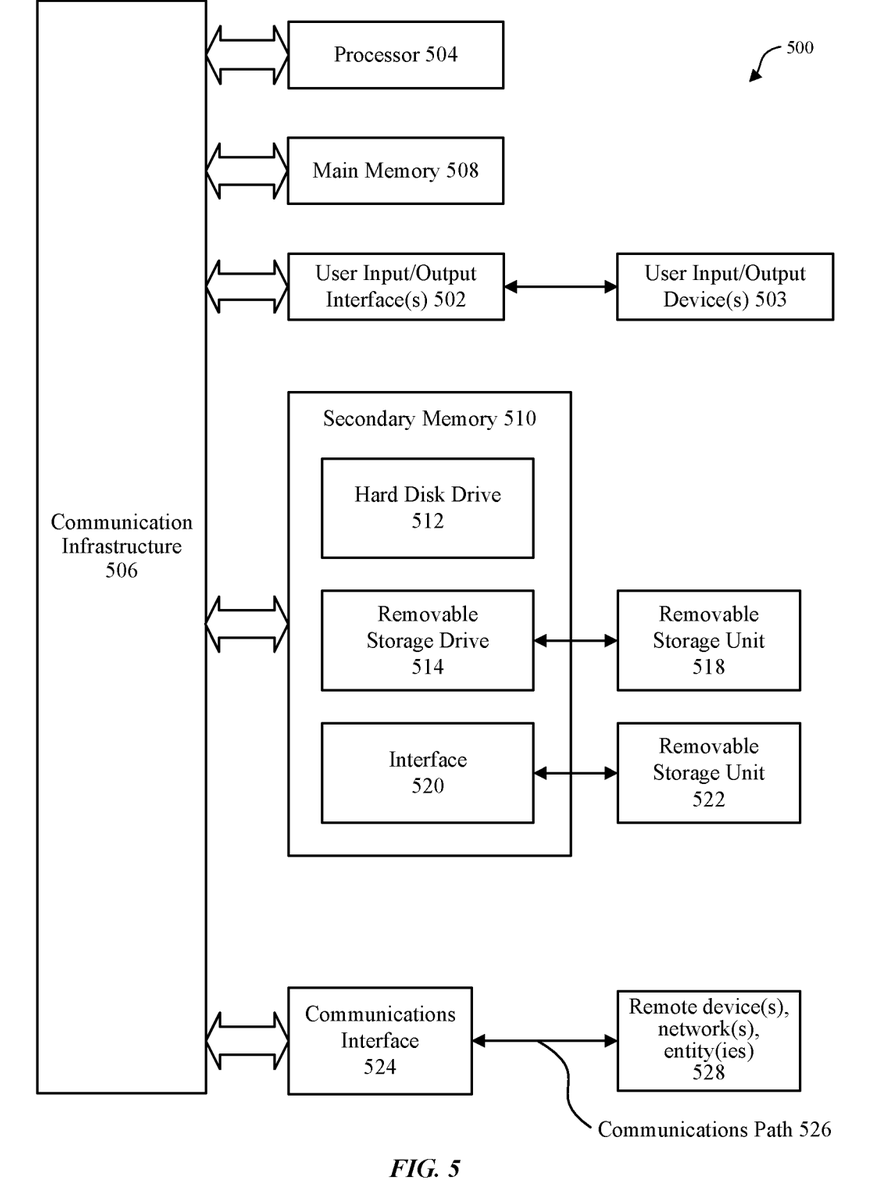
FIG. 5 is an example computer system for implementing some aspects or portion(s) thereof.

Various aspects can be implemented, for example, using one or more computer systems, such as computer system 500 shown in FIG. 5. Computer system 500 can be any well-known computer capable of performing the functions described herein such as devices base stations 101 and 103, and device 105 of FIG. 1, and/or 200 of FIG. 2. Computer system 500 includes one or more processors (also called central processing units, or CPUs), such as a processor 504. Processor 504 is connected to a communication infrastructure 506 (e.g., a bus). Computer system 500 also includes user input/output device(s) 503, such as monitors, keyboards, pointing devices, etc., that communicate with communication infrastructure 506 through user input/output interface(s) 502. Computer system 500 also includes a main or primary memory 508, such as random access memory (RAM). Main memory 508 may include one or more levels of cache. Main memory 508 has stored therein control logic (e.g., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to some aspects, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 500, main memory 508, secondary memory 510 and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 5. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one aspect," "aspects" "an example," "examples," or similar phrases, indicate that the aspect(s) described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A base station, comprising:
    a transceiver configured to enable wireless communication with a user equipment (UE); and
    a processor communicatively coupled to the transceiver and configured to:
        determine a Doppler shift pre-compensation value associated with the UE in response to determining that the UE is moving with a speed greater than a threshold;
        generate an aperiodic Tracking Reference Signal (AP-TRS) or a semi persistent TRS (SP-TRS) for the UE, wherein the AP-TRS or the SP-TRS is decoupled from a periodic TRS (P-TRS) generated by the base station;
        pre-compensate the AP-TRS or the SP-TRS based on the determined Doppler shift pre-compensation value;
        transmit, using the transceiver, the pre-compensated AP-TRS or the pre-compensated SP-TRS to the UE;
        configure a first plurality of UEs with same Doppler shift values to be in an awake mode at a same Discontinuous Reception (DRX) on duration; and
        configure the first plurality of UEs to measure a pre-compensated P-TRS or the pre-compensated SP-TRS that are transmitted before the DRX on duration.

2. The base station of claim 1, wherein the pre-compensated AP-TRS or the pre-compensated SP-TRS is used for time and frequency synchronization with the base station.

3. The base station of claim 1, wherein the processor is further configured to transmit, using the transceiver, at least one of a Demodulation Reference Signal (DMRS) that is pre-compensated with the determined Doppler shift pre-compensation value or a signal on a Physical Downlink Shared Channel (PDSCH) that is pre-compensated with the determined Doppler shift pre-compensation value.

4. The base station of claim 1, wherein the processor is further configured to transmit, using the transceiver, a Downlink Control Information (DCI) Format 1_1 or a DCI Format 1_2 to the UE to trigger the UE to measure the pre-compensated AP-TRS when the AP-TRS is pre-compensated AP-TRS when the AP-TRS is pre-compensated.

5. The base station of claim 4, wherein the DCI Format 1_1 or the DCI Format 1_2 comprises a Channel State Information (CSI) request field.

6. The base station of claim 1, wherein the processor is configured to transmit, using the transceiver, a single Downlink Control Information (DCI) to trigger a second plurality of UEs to measure the pre-compensated AP-TRS or the pre-compensated SP-TRS.

7. The base station of claim 6, wherein the single DCI comprises at least one of a DCI Format 0_1, a DCI Format 0_2, a DCI Format 1_1, or a DCI Format 1_2 and wherein the single DCI comprises a group Radio Network Temporary Identifier (RNTI) associated with the second plurality of UEs.

8. The base station of claim 6, wherein the single DCI comprises at least one of a DCI Format 2_x, wherein x is one of 0, 1, 2, 3, 4, 5, or 6, and wherein the DCI Format 2_x comprises a Cyclic Redundancy Check (CRC) scrambled with a group Radio Network Temporary Identifier (RNTI).

9. The base station of claim 8, wherein the single DCI further comprises a plurality of blocks, each block of the single DCI corresponds to one group of UEs in the second plurality of UEs.

10. The base station of claim 1, wherein the processor is further configured to transmit, using the transceiver, at least one of a Demodulation Reference Signal (DMRS) or a signal on a Physical Downlink Shared Channel (PDSCH), wherein at least one quasi-colocation (QCL) parameter associated with the DMRS or the PDSCH is only common with the P-TRS of the base station.

11. The base station of claim 1, wherein the processor is further configured to transmit, using the transceiver, at least one of a Demodulation Reference Signal (DMRS) or a signal on a Physical Downlink Shared Channel (PDSCH), wherein at least one quasi-colocation (QCL) parameter associate with the DMRS or the signal on the PDSCH is common with the P-TRS of the base station and a second P-TRS of a second base station.

12. A method, comprising:
    determining, by a base station, a Doppler shift pre-compensation value associated with a user equipment (UE) in response to determining that the UE is moving with a speed greater than a threshold;
    generating, by the base station, an aperiodic Tracking Reference Signal (AP-TRS) or a semi persistent TRS (SP-TRS) for the UE, wherein the AP-TRS or the SP-TRS is decoupled from a periodic TRS (P-TRS) generated by the base station;

pre-compensating, by the base station, the AP-TRS or the SP-TRS based on the determined Doppler shift pre-compensation value;

transmitting, by the base station and based on the determined Doppler shift pre-compensation value, the pre-compensated AP-TRS or the pre-compensated SP-TRS to the UE, wherein the pre-compensated AP-TRS or the pre-compensated SP-TRS is used for time and frequency synchronization with the base station;

configuring, by the base station, a first plurality of UEs with same Doppler shift values to be in an awake mode at a same Discontinuous Reception (DRX) on duration; and configuring, by the base station, the first plurality of UEs to measure a pre-compensated P-TRS or the pre-compensated SP-TRS that are transmitted before the DRX on duration.

13. A user equipment (UE), comprising:
a transceiver configured to enable wireless communication with a base station; and
a processor communicatively coupled to the transceiver and configured to:
  receive, using the transceiver and from the base station, an aperiodic Tracking Reference Signal (AP-TRS) or a semi persistent TRS (SP-TRS), wherein the AP-TRS or the SP-TRS is decoupled from a periodic TRS (P-TRS) of the base station, and wherein the AP-TRS or the SP-TRS is pre-compensated with a Doppler shift pre-compensation value; and
  use the AP-TRS or the SP-TRS to perform time and frequency synchronization with the base station,
  wherein the UE is part of a first plurality of UEs that are configured with same Doppler shift values to be in an awake mode at a same Discontinuous Reception (DRX) on duration, and
  wherein the first plurality of UEs are configured to measure a pre-compensated P-TRS or the pre-compensated SP-TRS that are transmitted before the DRX on duration.

14. The UE of claim 13, wherein the processor is further configured to receive, using the transceiver and from the base station, at least one of a Demodulation Reference Signal (DMRS) that is pre-compensated with the Doppler shift pre-compensation value or a signal on a Physical Downlink Shared Channel (PDSCH) that is pre-compensated with the Doppler shift pre-compensation value.

15. The UE of claim 13, wherein the processor is further configured to transmit, using the transceiver, an estimated Doppler shift value to the base station to be used for determining the Doppler shift pre-compensation value.

16. The UE of claim 13, wherein the processor is further configured to receive, using the transceiver and from the base station, a signal for triggering the UE to measure the AP-TRS or the SP-TRS.

17. The UE of claim 16, wherein the signal comprises a Downlink Control Information (DCI) Format 1_1 or a DCI Format 1_2 comprising a Channel State Information (CSI) request field.

* * * * *